(12) United States Patent
Kasamatsu et al.

(10) Patent No.: US 6,903,901 B2
(45) Date of Patent: Jun. 7, 2005

(54) HEAD SLIDER HAVING PROTECTOR PROTUBERANCE IN FRONT OF HEAD ELEMENT

(75) Inventors: Yoshiharu Kasamatsu, Kawasaki (JP); Hiroyuki Hyodo, Kawasaki (JP); Susumu Yoshida, Kawasaki (JP); Toru Yokohata, Kawasaki (JP); Masaki Kameyama, Kawasaki (JP); Kenrou Yamamoto, Kawasaki (JP); Masaharu Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 10/104,190

(22) Filed: Mar. 22, 2002

(65) Prior Publication Data

US 2003/0123191 A1 Jul. 3, 2003

(30) Foreign Application Priority Data

Dec. 28, 2001 (JP) ......................................... 2001-400898

(51) Int. Cl.[7] ................................................ G11B 5/60
(52) U.S. Cl. ..................................................... 360/235.8
(58) Field of Search ............................... 360/235.4–240

(56) References Cited

U.S. PATENT DOCUMENTS

| 5,625,512 | A | * | 4/1997 | Smith ....................... 360/236.6 |
| 6,188,547 | B1 | * | 2/2001 | Gui et al. ................. 360/236.5 |
| 6,212,042 | B1 | * | 4/2001 | Gui et al. ................. 360/236.6 |
| 6,424,494 | B1 | * | 7/2002 | Koishi ...................... 360/235.6 |
| 6,501,622 | B2 | * | 12/2002 | Koishi ...................... 360/236.6 |
| 6,529,347 | B2 | * | 3/2003 | Hipwell et al. .......... 360/236.6 |
| 6,556,389 | B1 | * | 4/2003 | Boutaghou et al. ......... 360/320 |
| 6,583,961 | B2 | * | 6/2003 | Levi et al. ................ 360/236.8 |
| 6,597,537 | B2 | * | 7/2003 | Tokuyama et al. ....... 360/236.6 |

FOREIGN PATENT DOCUMENTS

| JP | 8-287440 | 11/1996 |
| JP | 10-247368 | 9/1998 |
| JP | 10-302238 | 11/1998 |
| JP | 2000-268316 | 9/2000 |
| WO | 99/00792 | 1/1999 |

* cited by examiner

*Primary Examiner*—Angel Castro
(74) *Attorney, Agent, or Firm*—Greer, Burns & Crain, Ltd.

(57) ABSTRACT

A protector protuberance is formed on a head slider incorporated in a recording medium drive such as a hard disk drive. The protector protuberance is allowed to collide against a contamination on a recording medium in front of a head element mounted on the head slider. The head element can be protected from collision against the contamination behind the protector protuberance. The protector protuberance is located as close to the head element as possible. Even with a smaller protector protuberance, the front and rear support protrusions contact the recording medium so as to hold the slider body above the surface of the recording medium. An increase can be prevented in the adsorption acting between the slider body and a lubricant agent spreading over the surface of the recording medium. A smaller protector protuberance enables the head element to approach the recording medium as close as possible upon read/write operations.

13 Claims, 5 Drawing Sheets

HEAD SLIDER HAVING PROTECTOR PROTUBERANCE IN FRONT OF HEAD ELEMENT

BACKGROUND OF THE INVENTION

1. Field of the Invention

The present invention relates to a head slider to be incorporated in a recording medium drive or storage device such as a hard disk drive (HDD), for example. In particular, the invention relates to a head slider including: a slider body defining a medium-opposed or bottom base surface; a front support protrusion standing on the slider body near the leading end of the slider body; and a rear support protrusion standing on the slider body rearward of the front support protrusion near the trailing end of the slider body. The tip ends of the front and rear support protrusions are located above the level of an air bearing surface defined on the slider body.

2. Description of the Prior Art

A so-called contact start stop (CSS) control is well known in the technical field of a hard disk drive (HDD). A head slider in general employed in the HDD utilizing the CSS control is often provided with front and rear support protrusions standing on the medium-opposed base surface of the slider body, as disclosed in Japanese Patent Application Publication 10-302238. The front and rear support protrusions serve to reduce the adsorption or meniscus effect between the slider body and a lubricant film spreading over the surface of the magnetic recording disk when the slider body is seated on the still magnetic recording disk. This leads to establishment of a reliable CSS control.

A magnetoresistive film is often utilized to read magnetic information out of the magnetic recording disk in HDDs. If the magnetoresistive film collides against a contamination located on the surface of the rotating magnetic recording disk, for example, the signal from the magnetoresistive film should suffer from a so-called thermal asperity. The thermal asperity leads to an error in reading the magnetic information, as conventionally known.

The rear support protrusion is utilized to prevent the thermal asperity in the above-referenced head slider. The rear support protrusion is expected to collide against a contamination in front of the magnetoresistive film during rotation of the magnetic recording disk. The magnetoresistive film can be prevented from colliding against the contamination behind the rear support protrusion. The magnetoresistive film is mostly protected from the collision in this manner. The thermal asperity can be prevented.

The rear support protrusion is preferably located closer to the magnetoresistive film in the above-referenced head slider, in order to reliably prevent the thermal asperity. The closer to the magnetoresistive film the rear support protrusion is located, the fewer collisions take place between the magnetoresistive film and the contamination. However, if the rear support protrusion gets closer to the trailing end of the slider body in this manner, the magnetoresistive film cannot sufficiently approach the magnetic recording disk. Improvement in recordation density should be hindered. In this case, if the height of the rear support protrusion is reduced, the magnetoresistive film is allowed to further approach the magnetic recording disk. This smaller rear support protrusion leads to increase in the adsorption of the lubricant film acting on the head slider. A larger adsorption leads to obstruction to the commencement of the rotation of the magnetic recording disk.

SUMMARY OF THE INVENTION

It is accordingly an object of the present invention to provide a head slider capable of locating a head element as close to a recording medium as possible without inducing a collision between the head element and a contamination or protuberance on the recording medium.

According to a first aspect of the present invention, there is provided a head slider comprising: a slider body defining a medium-opposed base surface, said medium-opposed base surface being opposed to a surface of a recording medium; a rail extending along the medium-opposed base surface; an air bearing surface defined on the rail; a head element mounted on the slider body and opposed to the recording medium at the air bearing surface; a front support protrusion standing on the slider body near a leading end of the slider body, a tip end of the front support protrusion being located above a level of the air bearing surface; a rear support protrusion standing on the slider body rearward of the front support protrusion near a trailing end of the slider body, a tip end of the rear support protrusion being located above the level of the air bearing surface; and a protector protuberance located on the air bearing surface rearward of the rear support protrusion and forward of the head element, a tip end of the protector protuberance being located below a level of the tip end of the rear support protrusion.

According to a second aspect of the present invention, there is provided a head slider comprising: a slider body defining a medium-opposed base surface, said medium-opposed base surface being opposed to a surface of a recording medium; a front rail extending along the medium-opposed base surface near a leading end of the slider body; a rear rail extending along the medium-opposed base surface near a trailing end of the slider body; a front air bearing surface defined on the front rail; a rear air bearing surface defined on the rear rail; a head element mounted on the slider body and opposed to the recording medium at the rear air bearing surface; a front support protrusion standing on the slider body near the leading end of the slider body, a tip end of the front support protrusion being located above a level of the front air bearing surface; a rear support protrusion standing on the slider body rearward of the front support protrusion near the trailing end of the slider body, a tip end of the rear support protrusion being located above a level of the rear air bearing surface; and a protector protuberance located on the rear air bearing surface rearward of the rear support protrusion and forward of the head element, a tip end of the protector protuberance being located below a level of the tip end of the rear support protrusion.

The head sliders mentioned above allow the front and rear support protrusions to support the slider body above the surface of the recording medium, for example. The air bearing surfaces are prevented from contacting the recording medium. The contact area can remarkably be reduced between the slider body and the recording medium, as compared with the case where the head slider allows the air bearing surfaces to contact the recording medium. As a result, only a smaller adsorption or meniscus effect can act on the slider body from a lubricant agent or oil film spreading over the surface of the recording medium.

It is preferable to avoid any collision between the head element mounted on the head slider and any obstacle such as a contamination existing on the surface of the recording medium. The collision is supposed to interfere with the read/write operations of the head element. The protector protuberance is allowed to collide against the obstacle in front of the head element. The head element can be protected from the collision against the obstacle behind the protector protuberance. The head element reliably keeps the read/write operations in a normal way.

It is preferable to locate the protector protuberance as close as possible to the head element. This location leads to a reliably prevention of the collision. In the aforementioned head sliders, the height of the protector protuberance is sufficiently set smaller as compared with the rear support protrusion. Even with a smaller protector protuberance, the front and rear protrusions serve to hold the slider body above the surface of the recording medium as described above. If the height of the protector protuberance is set smaller, the protector protuberance is easily allowed to approach the head element, namely, the trailing end of the slider body as close as possible. The protector protuberance closer to the trailing end of the slider body in this manner still keeps avoidance of the collision between the protector protuberance and the recording medium.

According to a third aspect of the present invention, there is provided a head slider comprising: a slider body defining a medium-opposed base surface, said medium-opposed base surface being opposed to a surface of a recording medium; a rail extending along the medium-opposed base surface; an air bearing surface defined on the rail; a head element mounted on the slider body and opposed to the recording medium at the air bearing surface; a pair of front support protrusions standing on the slider body near a leading end of the slider body, tip ends of the front support protrusions being located above a level of the air bearing surface; a pair of rear support protrusions standing on the slider body rearward of the front support protrusions near a trailing end of the slider body, tip ends of the rear support protrusions being located above the level of the air bearing surface; and a protector protuberance located on the air bearing surface rearward of the rear support protrusion and forward of the head element, a tip end of the protector protuberance being located below a level of the tip end of the rear support protrusion, wherein the trailing end of the slider body is kept spaced from a surface of the recording medium when the tip ends of the rear support protrusions and the protector protuberance are simultaneously received on the surface of the recording medium.

The head slider mentioned above allows the front and rear support protrusions to support the slider body above the surface of the recording medium, for example. The front and rear air bearing surfaces are prevented from contacting the recording medium. The contact area can remarkably be reduced between the slider body and the recording medium, as compared with the case where the head slider allows the air bearing surfaces to contact the recording medium. As a result, only a smaller adsorption or meniscus effect can act on the slider body from a lubricant agent or oil film spreading over the surface of the recording medium.

Even when the head slider inclines rearward around the rear support protrusions, for example, the tip end of the protector protuberance in addition to the tip ends of the rear support protrusions is received on the surface of the recording medium. The inclination of the head slider thus causes the front support protrusions to take off from the surface of the recording medium. The slider body then contacts the recording medium at three points. Accordingly, any increase in the contact area is prevented between the slider body and the recording medium. The adsorption or friction can be kept suppressed.

The protector protuberance is allowed to collide against an obstacle such as a contamination in front of the head element in the same manner as described above. The head element can be protected from the collision against the obstacle behind the protector protuberance. The head element reliably keeps the read/write operations in a normal way. Furthermore, the height of the protector protuberance can sufficiently be set smaller as compared with the rear support protrusion in the same manner as described above. Even with a smaller protector protuberance, the front and rear protrusions serve to hold the slider body above the surface of the recording medium as described above. The protector protuberance is easily allowed to approach the head element, namely, the trailing end of the slider body as close as possible. The protector protuberance being closer to the trailing end of the slider body in this manner still keeps avoidance of the collision between the protector protuberance and the recording medium.

In general, the head slider is maintained in an inclined attitude defining an inclination angle θ between the surface of the recording medium and the air bearing surface. The trailing end of the slider body is set as the datum line or centerline in measurement of the inclination angle θ. In this situation, a following expression is preferably established:

$$P \geq \frac{H}{\tan\theta} \quad \text{[Expression 1]}$$

where H is a height of the protector protuberance, and P corresponds to a distance between the trailing end of the slider body and the protector protuberance. According to the mentioned relationship, the tip end of the protector protuberance is prohibited from approaching the recording medium beyond an orbit of the trailing end of the slider body, unless the inclination angle θ gets reduced. In this manner, the space between the head slider and the recording medium can be determined based on the trailing end of the slider body irrespective of existence of the protector protuberance.

The protector protuberance preferably extends in the lateral direction of the slider body by an amount larger than the width of a transducer included in the head element. The protector protuberance of this type serves to reliably avoid collision between the transducer and an obstacle such as a contamination. Accordingly, generation of a thermal asperity is reliably avoided. The protector protuberance may be a wall extending on the air bearing surface in the lateral direction of the slider body in parallel with the transducer. The protector protuberance of this type is reliably allowed to collide against the obstacle in front of the transducer. The obstacle cannot pass by the protector protuberance to reach the transducer. The transducer is reliably protected from collision against the obstacle. The height H of the protector protuberance may be set in a range between 3 nm and 20 nm.

It is also preferable to establish a following expression:

$$L = S \cdot \frac{1}{2R} \quad \text{[Expression 2]}$$

where S corresponds to a relative velocity between the head slider and the recording medium, R corresponds to a natural frequency of an air film formed between the slider body and the recording medium, and L corresponds to a distance between the head element and the protector protuberance.

In general, when the recording medium moves relative to the head slider, a so-called air film is formed between the slider body and the surface of the recording medium. The air film has the property of a spring. This spring is combined with the mass of the slider body so as to establish a vibration system. The natural frequency R of the vibration system is supposed to rule the ups and downs of the slider body. Specifically, it is estimated to spend half the period of the natural frequency R to allow the slider body to return, after the lift caused by a collision, to the level or flying height which has been established before the lift. Accordingly, if the relative velocity S of the recording medium and the natural frequency R of the air film are related to the distance L between the head element and the protector protuberance as described above, the head element is also allowed to simultaneously fly over the obstacle when the protector protuberance collides against the obstacle.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
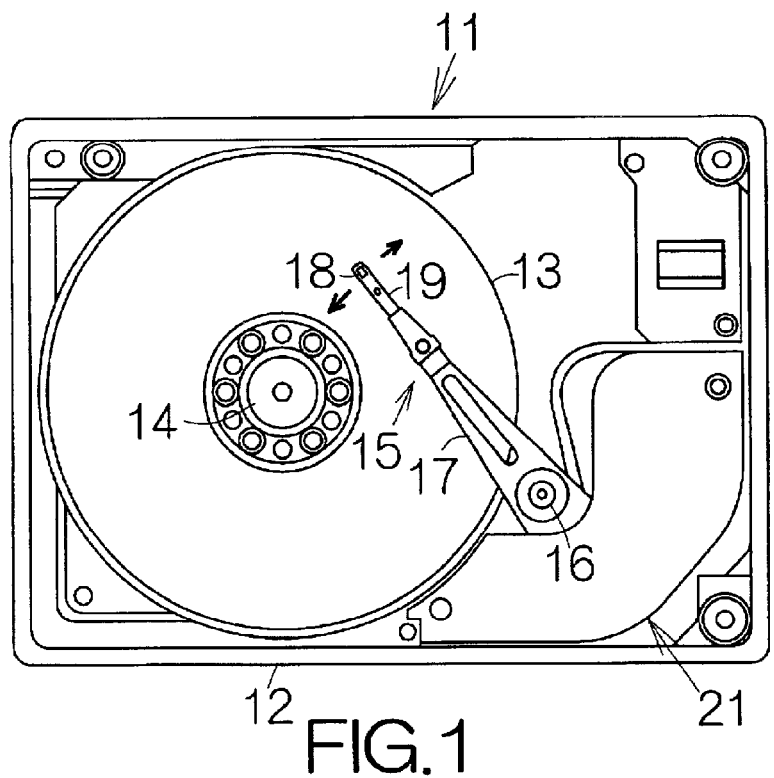
FIG. 1 is a plan view schematically illustrating the structure of a hard disk drive (HDD) as an example of a magnetic recording medium drive.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A so-called Hall-less motor may be employed as the spindle motor 14, for example. A cover, not shown, is coupled to the primary enclosure 12 so as to define the closed inner space between the primary enclosure 12 and itself.

A carriage 15 is also accommodated in the inner space of the primary enclosure 12. The tip or front end of the carriage 15 is opposed to the surface of the magnetic recording disk 13. The carriage 15 includes a rigid swinging arm 17 capable of swinging around a support shaft 16, and an elastic head suspension 19 fixed to the tip end of the swinging arm 17 so as to hold a flying head slider 18 at the tip end. An electromagnetic actuator 21 such as a voice coil motor (VCM) can be employed to realize the swinging movement of the swinging arm 17, for example. When the swinging arm 17 is forced to swing about the support shaft 16, the flying head slider 18 is allowed to cross the recording tracks defined on the magnetic recording disk 13 in the radial direction of the magnetic recording disk 13. This radial movement serves to position the flying head slider 19 right above a target recording track on the magnetic recording disk 13. As conventionally known, in the case where two or more magnetic recording disks 13 are incorporated within the inner space of the primary enclosure 12, a pair of the flying head sliders 18, namely, the elastic head suspensions 19 are mounted on a single common swinging arm 17 between the adjacent magnetic recording disks 13.

Figure 2:
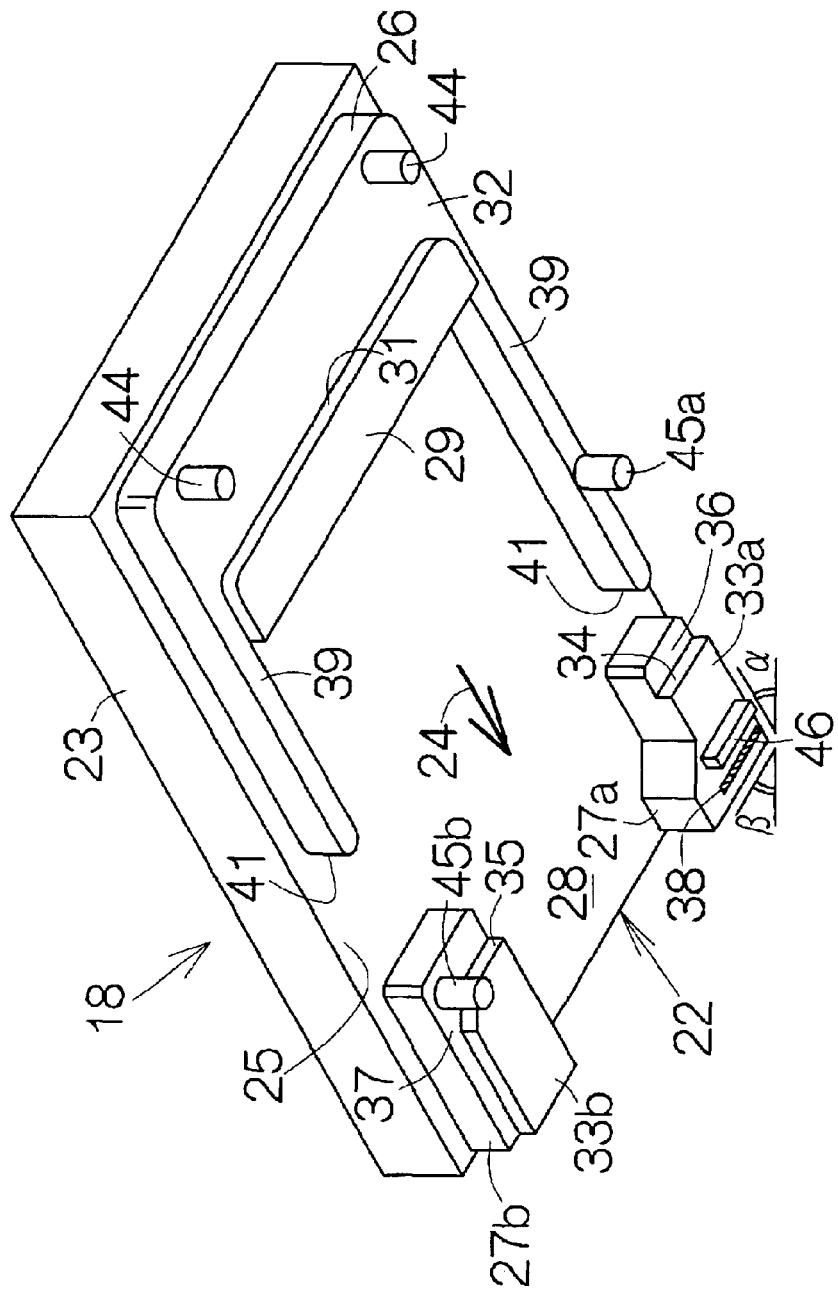
FIG. 2 illustrates an enlarged perspective view of a flying head slider according to a specific example of the present invention.

FIG. 2 illustrates a specific example of the flying head slider 18 according to the present invention in detail. The flying head slider 18 includes a slider body 23 of a flat parallelepiped, for example. The slider body 23 is designed to oppose its medium-opposed or bottom surface 22 to the magnetic recording disk 13. A front rail 26 is formed to stand on a flat base surface 25 of the bottom surface 22 near the leading or inflow end of the slider body 23. The terms "leading" and "inflow" are defined based on the direction of an airflow 24. The airflow 24 can be generated along the surface of the rotating magnetic recording disk 13. The front rail 26 is designed to extend in the lateral direction of the slider body 23 in parallel with the leading end of the base surface 25. The height of the front rail 26 from the base surface 25 may be set approximately at 1.5–2.0 $\mu$m, for example.

Likewise, a pair of rear rails 27a, 27b are formed to stand on the base surface 25 of the bottom surface 22 near the trailing or outflow end of the slider body 23. The terms "trailing" and "outflow" are defined based on the direction of an airflow 24 in the same manner as described above. The rear rails 27a, 27b are arranged in a row in the lateral direction so to as define an airflow passage 28 for the airflow 24. The rear rails 27a, 27b are designed to extend downstream in the rearward direction toward the trailing end of the base surface 25. The height of the respective rear rails 27a, 27b from the base surface 25 may be set at a predetermined height equal to the aforementioned height of the front rail 26.

A front air bearing surface 29 in the form of a strip is defined on the top surface of the front rail 26. The front air bearing surface 29 is designed to extend in the lateral direction of the slider body 23. A step 31 is defined on the top surface of the front rail 26 at the leading or inflow end of the front air bearing surface 29. As is apparent from FIG. 2, the step 31 may be formed all over the periphery of the front air bearing surface 29 except the trailing or outflow end thereof. The step 31 serves to define a lower level surface 32 extending over the top surface of the front rail 26 at a level lower than the front air bearing surface 29. During rotation of the magnetic recording disk 13, the airflow 24 generated along the surface of the magnetic recording disk 13 is allowed to flow along the lower level surface 32, the step 31 and the front air bearing surface 29 in this sequence. The step 31 enables generation of a larger positive pressure or lift on the front air bearing surface 29.

First and second rear air bearing surfaces 33a, 33b are respectively defined on the top surfaces of the rear rails 27a, 27b. A step 34 is defined on the top surface of the rear rail 27a at the leading or inflow end of the first rear air bearing surface 33a. Likewise, a step 35 is defined on the top surface of the rear rail 27b at the leading or inflow end of the second rear air bearing surface 33b. As shown in FIG. 2, the step 35 may be formed to extend along the periphery of the second rear air bearing surface 33b toward the trailing or outflow end of the second rear air bearing surface 33b. The steps 34, 35 serve to define lower level surfaces 36, 37 extending over the top surfaces of the rear rails 27a, 27b, respectively, at a level lower than the first and second rear air bearing surfaces 33a, 33b. During rotation of the magnetic recording disk 13, the airflow 24 generated along the surface of the magnetic recording disk 13 is allowed to flow along the lower surfaces 36, 37, the steps 34, 35 and the first and second rear air bearing surfaces 33a, 33b in this sequence. The steps 34, 35 enable generation of a larger positive pressure or lift on the first and second air bearing surfaces 33a, 33b, respectively.

The flying head slider 18 of this type allows generation of a larger positive pressure or lift on the front air bearing surface 29 rather than a combination of the first and second rear air bearing surfaces 33a, 33b. Accordingly, when the slider body 23 flies above the surface of the magnetic recording disk 13, the slider body 23 keeps the attitude of a pitch angle α. The pitch angle α is defined as an inclined angle in the direction of the airflow 24, namely, in the back-and-forth direction of the slider body 23. In addition, the first rear air bearing surface 33a is set smaller than the second rear air bearing surface 33b, so that a larger positive pressure or lift can be generated on the second rear air bearing surface 33b rather than the first rear air bearing surface 33a when the airflow 24 acts on the slider body 23. Accordingly, when the slider body 23 flies above the surface of the magnetic recording disk 13, the slider body 23 is allowed to keep the attitude of a roll angle β. The roll angle β is defined as an inclined angle in a direction perpendicular to the direction of the airflow 24, namely, in the lateral direction of the slider body 23.

A magnetic head or transducer element 38 is located on the first rear air bearing surface 33a. The magnetic head element 38 is embedded in the slider body 23. The front or exposed end of the magnetic head element 38 may be covered with a hard protection coating, such as a diamond-like-carbon (DLC) film and the like, at the first rear air bearing surface 33a. A combination of the pitch and roll angles α, β serves to minimize the distance between the trailing end of the first rear air bearing surface 33a and the surface of the magnetic recording disk 13. Since the magnetic head element 38 is located closer to the trailing end of the first rear air bearing surface 33a, the magnetic head element 38 can read and write magnetic information data into and out of the magnetic recording disk 13 in an efficient manner. The magnetic head element may include a write head element such as a thin film magnetic head utilizing a thin film coil pattern, for example, and a read head element such as a giant magnetoresistive (GMR) element, a tunnel-junction magnetoresistive (TMR) element, and the like. The read head element may include an electromagnetic transducer film, such as spin valve film or tunnel-junction film, extending in the lateral direction along the first rear air bearing surface 33a.

A pair of side rails 39 are formed to stand on the base surface 25 of the slider body 23. The respective side rails 39 are connected to the front rail 26 at its opposite ends in the lateral direction of the slider body 23 so as to extend toward the trailing end of the base surface 25. The side rails 39 are designed to prevent an airflow, which collides against the front rail 26 during rotation of the magnetic recording disk 13, from entering a space behind the front rail 26 even when the airflow flows around the opposite ends of the front rail 26. The airflow 24 flowing beyond the front rail 26 across the front air bearing surface 29 is thus easily expanded in the vertical direction upright to the surface of the magnetic recording disk 13. The expansion of the airflow 24 serves to generate a negative pressure behind the front rail 26. The aforementioned lift of the slider body 23 is balanced with the negative pressure so as to set the flying height of the slider body 23 above the surface of the magnetic recording disk 13. Recesses 41 are defined between the side rails 39 and the corresponding rear rails 27a, 27b, respectively. The recesses 41 serve to introduce the airflow having flowed around the opposite ends of the front rail 26 into the airflow passage 28 between the rear rails 27a, 27b. The side rails 39 define the top surfaces, respectively, leveled or flush with the lower level surface 32 on the front rail 26.

A pair of front support protrusions 44, namely, front adsorption prevention pads, are formed on the front rail 26 so as to stand on the lower level surface 32. The front support protrusions 44 are preferably located adjacent the leading end of the base surface 25 as close as possible. The front support protrusions 44 define the tip ends, respectively, located above the level of the front air bearing surface 29 as well as the first and second rear air bearing surfaces 33a, 33b.

Likewise, a first rear support protrusion 45a, namely, a rear adsorption prevention pad, is formed on the side rail 39 closer to the first rear air bearing surface 33a. The first rear support protrusion 45a is designed to stand on the top surface of the side rail 39. Additionally, a second rear support protrusion 45b, namely, a rear adsorption prevention pad, is formed on the rear rail 27b. The second rear support protrusion 45b is designed to stand on the lower level surface 37. The rear support protrusions 45a, 45b are located, rearward of the front support protrusions 44, at positions distanced from the trailing end of the base surface 25. The rear support protrusions 45a, 45b define the tip ends, respectively, located above the level of the front air bearing surface 29 as well as the first and second rear air bearing surfaces 33a, 33b, in the same manner as the aforementioned front support protrusions 44. The height of the rear support protrusions 45a, 45b may be set equal to that of the front support protrusions 44. The height of the support protrusions 44, 45a, 45b may be set in a range approximately between 20–80 nm, for example.

Figure 3:
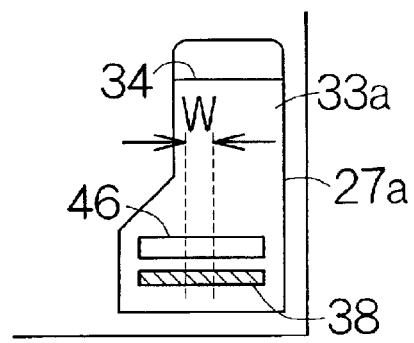
FIG. 3 is an enlarged partial plan view of the flying head slider for schematically illustrating a first rear air bearing surface.

A protector protuberance 46 is formed on the slider body 23 at least rearward of the rear support protrusion 45a. The protector protuberance 46 is designed to stand on the first rear air bearing surface 33a. The protector protuberance 46 defines the tip end located below the level of the tip ends of the rear support protrusions 45a, 45b. The protector protuberance 46 comprises, in this case, a wall extending in the lateral direction of the slider body 23 in parallel with the electromagnetic transducer film included in the magnetic head element 38, for example. In addition, as is apparent from FIG. 3, the protector protuberance 46 is located forward of the magnetic head element 38. The protector protuberance 46 is allowed to extend wider than the magnetic head element 38 in the lateral direction of the slider body 23. The protector protuberance 46 may have the lateral dimension larger than at least the width W of the electromagnetic transducer film included in the magnetic head element 38.

Figure 4:
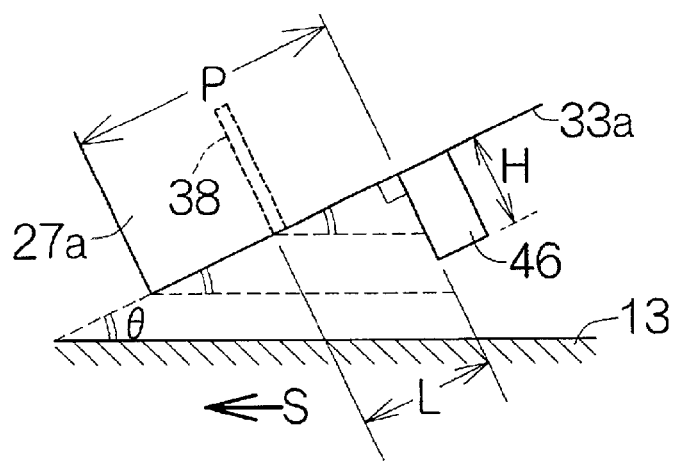
FIG. 4 is an enlarged partial side view of the flying head slider for schematically illustrating a protector protuberance on the first rear air bearing surface.

As shown in FIG. 4, the flying head slider 18 is maintained in an inclined flying attitude defining the inclination angle θ[°] between the surface of the magnetic recording disk 13 and the first rear air bearing surface 33a during the flight of the flying head slider 18. The trailing end of the slider body 23 is set as the datum line or centerline in measurement of the inclination angle θ. The inclination angle θ corresponds to the aforementioned pitch angle α. The height H[μm] of the protector protuberance 46 can be related to the distance P[μm] between the trailing end of the slider body 23 and the protector protuberance 46 in accordance with the following expression:

$$P \geq \frac{H}{\tan\theta} \quad \text{[Expression 1]}$$

The relative velocity S[m/sec] between the flying head slider 18 and the magnetic recording disk 13 as well as the natural frequency R[Hz] of the air film formed between the slider body 23 and the magnetic recording disk 13 can be related to the distance L[m] between the exposed end of the magnetic head element 38 and the protector protuberance 46 in accordance with the following expression:

$$L = S \cdot \frac{1}{2R} \quad \text{[Expression 2]}$$

Since the relative velocity S increases as the flying head slider 18 moves toward the outer periphery from the center of the magnetic recording disk 13, the relative velocity S for the flying head slider 18 at the innermost position should be applied to the above Expression 2.

Figure 5:
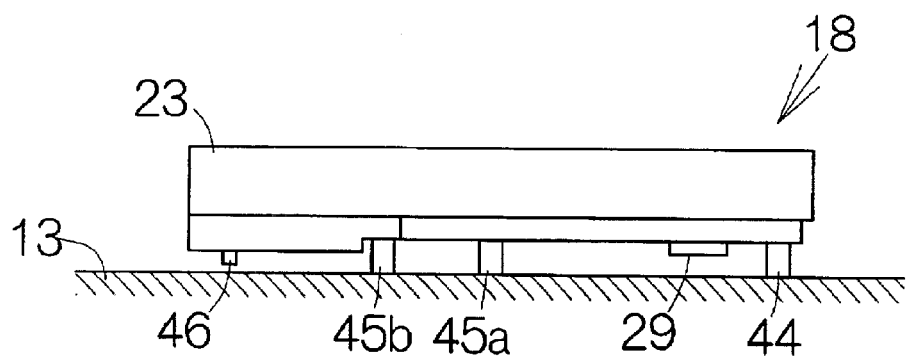
FIG. 5 is a side view schematically illustrating the flying head slider seated on the surface of the still magnetic recording disk.

When the magnetic recording disk 13 stands still, the slider body 23 of the flying head slider 18 is seated on the surface of the magnetic recording disk 13, as shown in FIG. 5, for example. The front and rear support protrusions 44, 45a, 45b serve to keep the front and rear air bearing surfaces 29, 33a, 33b distanced apart from the surface of the magnetic recording disk 13. The contact area can be minimized between the slider body 23 and the surface of the magnetic recording disk 13 as compared with the case where the flying head slider 18 contacts the magnetic recording disk 13 over the air bearing surfaces 29, 33a, 33b. A smaller adsorption or effect of meniscus is only allowed to act on the slider body 23 from a lubricating agent or oil spreading over the surface of the magnetic recording disk 13.

Figure 6:
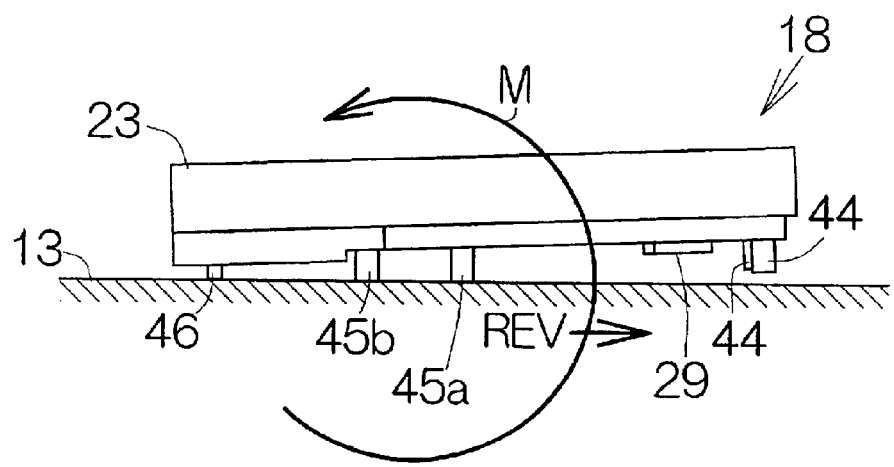
FIG. 6 is a side view schematically illustrating the flying head slider inclined due to the reverse rotation of the magnetic recording disk.

Assume that the magnetic recording disk 13 rotates reversely. As is apparent from FIG. 6, the surface of the magnetic recording disk 13 moves in the reverse direction REV. A moment M acts on the slider body 23 around the axis passing through the tip ends of the rear support protrusions 45a, 45b. The slider body 23 thus rotates around the top ends of the rear support protrusions 45a, 45b for inclination. The front support protrusions 44 is forced to take off f from the surface of the magnetic recording disk 13. At the same time, the tip end of the protector protuberance 46 rearward of the rear support protrusions 45a, 45b is received on the surface of the magnetic recording disk 13. Specifically, the slider body 23 contacts on the magnetic recording disk 13 at three points. Any increase in the contact area is prevented between the slider body 23 and the magnetic recording disk 13. The adsorption or friction can be kept suppressed.

Additionally, the trailing end of the slider body 23 is maintained at a position spaced from the surface of the magnetic recording disk 13. Meniscus effect can be suppressed between the slider body 23 and the magnetic recording disk 13. Any increase in the adsorption or friction can be prevented between the slider body 23 and the surface of the magnetic recording disk 13. It is possible to avoid a defect in commencement of the rotation of the magnetic recording disk 13 due to an increase in the adsorption or friction. Even with the spindle motor 14 of a smaller torque, the magnetic recording disk 13 reliably starts rotating in a normal way.

Figure 7:
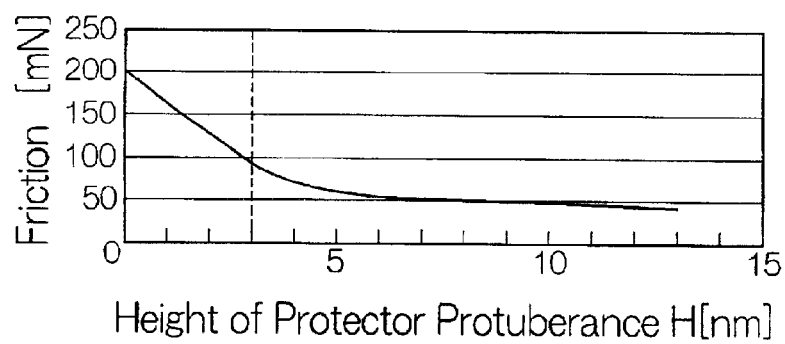
FIG. 7 is a graph illustrating the relationship between the height of the protector protuberance and the friction of the flying head slider against the magnetic recording disk.

The inventors have measured the force required to allow the slider body 23 to start moving on the surface of the magnetic recording disk 13. The measured force corresponds to the friction or adsorption acting on the slider body 23 from the lubricant agent spreading over the surface of the magnetic recording disk 13. In measurement, the height of the support protrusions 44, 45a, 45b were set at 40 nm. The thickness t of the lubricant agent was set at 1.1 nm. As is apparent from FIG. 7, it has been proved that the friction is sufficiently suppressed between the slider body 23 and the magnetic recording disk 13 when the height H of the protector protuberance 46 exceeds 3 nm. It has also been proved that a constant sufficient suppression of the friction can be maintained after the height H of the protector protuberance 46 exceeds 5 nm.

During flight of the flying head slider 18, the magnetic head element 38 opposed to the surface of the magnetic recording disk 13 realizes the read/write operations of magnetic information data. As described above, the rear support protrusions 45a, 45b are located spaced from the trailing end of the base surface 25. Accordingly, when the flying head slider 18 is maintained in the inclined attitude of the pitch angle α during the flight, the flying head slider 18 simply allows the magnetic head element 38 to approach the magnetic recording disk 13 as close as possible without inducing collision or interference between the rear support protrusions 45a, 45b and the magnetic recording disk 13.

Figure 8:
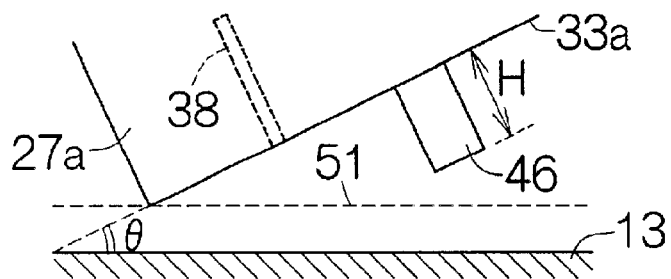
FIG. 8 is an enlarged partial side view of the flying head slider for schematically illustrating the trailing end of the flying head slider during flight.

As is apparent from FIG. 8, the trailing end of the slider body 23 moves along an orbit 51 established in parallel with the surface of the magnetic recording disk 13. Since the aforementioned relationship is established between the height H of the protector protuberance 46 and the distance P from the trailing end of the base surface 25 to the protector protuberance 46, the tip end of the protector protuberance 46 is prohibited from approaching the magnetic recording disk 13 beyond the orbit 51, unless the pitch angle α or inclination angle θ gets reduced. In this manner, the flying height of the slider body 23 can be determined based on the trailing end of the slider body 23 irrespective of existence of the protector protuberance 46.

Figure 9:
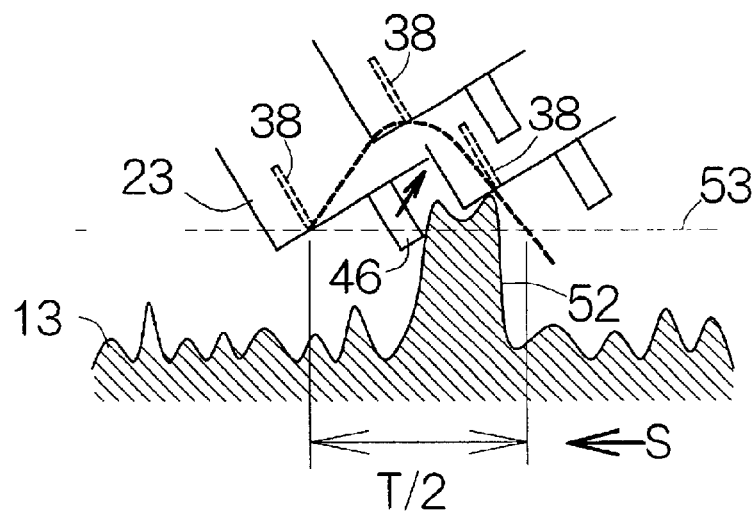
FIG. 9 is an enlarged partial side view schematically illustrating an orbit of the magnetic head element when the protector protuberance collides against a contamination.

Now, assume that a so-called contamination 52 happens to exist on the surface of the magnetic recording disk 13, as shown in FIG. 9, for example. The contamination 52 is supposed to define the tip end above the level of an orbit 53 which the magnetic head element 38 follows during the flight of the flying head slider 18.

In this case, when the magnetic recording disk 13 rotates, the protector protuberance 46 is allowed to collide against the contamination 52 before the exposed end of the magnetic head element 38 reaches the contamination 52. The slider body 23 further lifts up from the surface of the magnetic recording disk 13 based on the counteraction of the collision. The protector protuberance 46 is accordingly allowed to fly over the contamination 52.

The air film is formed between the bottom surface 22 of the slider body 23 and the surface of the magnetic recording disk 13. The air film has the property of a spring. This spring is combined with the mass of the slider body 23 so as to establish a vibration system. The natural frequency R of the vibration system is supposed to rule the ups and downs of the slider body 23. Specifically, it is estimated to spend half the period (=T/2) of the natural frequency R to allow the slider body 23 to return, after the lift caused by the aforementioned collision, to the level or flying height which has been established before the lift. Accordingly, if the relative velocity S of the magnetic recording disk 13 and the natural frequency R of the air film are related to the distance L between the exposed end of the magnetic head element 38 and the protector protuberance 46 as described above, the exposed end of the magnetic head element 38 is also allowed to simultaneously fly over the contamination 52. In particular, any contact or collision can reliably be prevented between the electromagnetic transducer film included in the magnetic head element 38 and the contamination 52. Generation of thermal asperity can be avoided.

Figure 10:
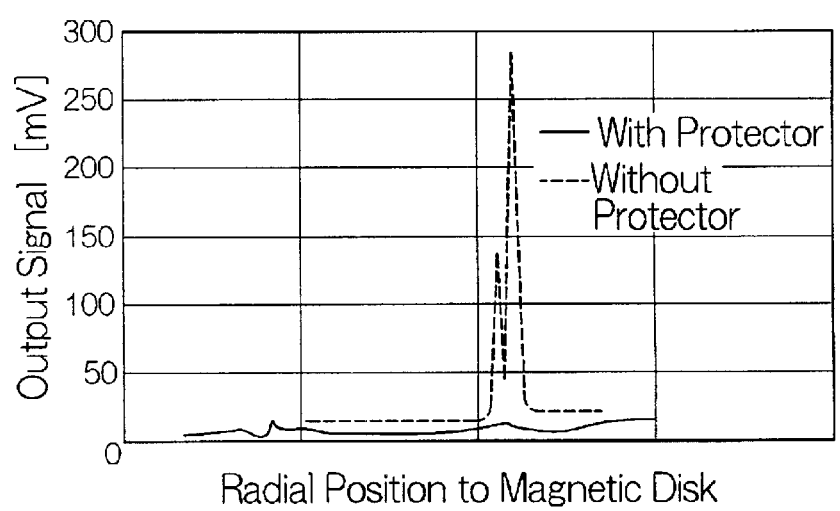
FIG. 10 is a graph showing a thermal asperity observed in the output signal from the magnetic head element when the magnetic head element collides against a contamination.

The inventors have measured the probability of a thermal asperity. In measurement, a contamination was intentionally located on the surface of the magnetic recording disk 13 at a position. The flying head slider 18 was then set opposed to the surface of the rotating magnetic recording disk 13. The magnetic head element 38 on the flying head slider 18 was gradually moved in the radial direction of the magnetic recording disk 13 when the magnetic information data was read out of the rotating magnetic recording disk 13. As is apparent from FIG. 10, no specific change could be found in the output signal from the magnetic head element 38.

The inventors have prepared a comparative example. A flying head slider 18 of the comparative example was allowed to have the same structure as the aforementioned flying head slider 18, except that no protector protuberance 46 was formed in the comparative example. The magnetic head element 38 on the flying head slider of the comparative example was likewise set to read out the magnetic information data out of the rotating magnetic recording disk 13. The flying head slier was kept moved in the radial direction of the rotating magnetic recording disk 13. As is apparent from FIG. 10, a remarkable increase was observed in the output signal in the comparative example. This increase was supposed to represent the collision of the magnetic head element 38 against the contamination. This is believed to be a thermal asperity.

The flying head slider 18 may be cut out of an $Al_2O_3$—TiC wafer as conventionally known, for example. Prior to the cut-out of the individual flying head slider 18, a so-called wafer bar is cut out of the wafer. The wafer bar includes a row of the flying head sliders 18. The section or cutting surface of the wafer bar is then shaped into the bottom surface 22 of the slider body 23.

When the bottom surface 22 is to be formed, three diamond-like-carbon (DLC) layers are first formed over the cutting surface of the wafer bar, for example. An Si adhesive layer or SiC adhesive layer may underlie under the individual DLC layer on the cutting surface. Sputtering may be employed to form the DLC layers as well as the adhesive layers, for example.

The support protrusions 44, 45a, 45b as well as the protector protuberance 46 are shaped out of the $Al_2O_3$—TiC material of the wafer and/or the DLC layers. The uppermost DLC layer provides the top surfaces or tip ends of the support protrusions 44, 45a, 45b. The intermediate DLC layer provides the top surface or tip end of the protector protuberance 46. The lowest DLC layer provides the protection coating over the air bearing surfaces 29, 33a, 33b. A reactive ion etching (RIE), ion milling, or the like, utilizing a photoresist film, for example, may be employed to form the support protrusion 44, 45a, 45b and the protector protuberance 46.

Figure 11:
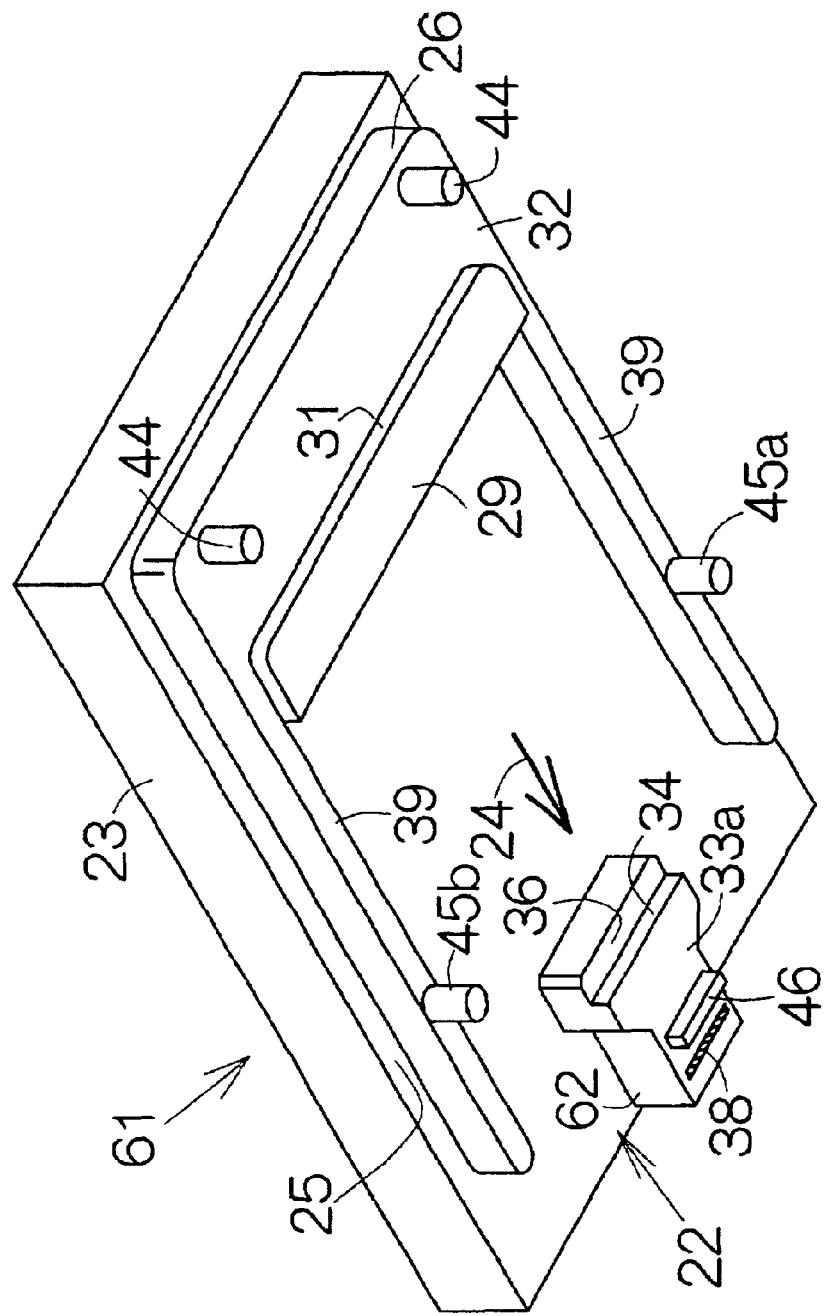
FIG. 11 is an enlarged perspective view schematically illustrating the structure of a flying head slider according to another specific example of the present invention.

FIG. 11 illustrates the structure of a flying head slider 61 according to another example of the present invention in detail. A single rear rail 62 is employed, in place of the rear rails 27a, 27b, in this flying head slider 61. The rear rail 61 may be located near the trailing or outflow end of the base surface 25 in the central area in the lateral direction of the slider body 23. In this case, the rear support protrusions 45a, 45b are respectively located on the top surfaces of the corresponding side rails 39. Like reference numerals are attached to the structure or component equivalent to that of the aforementioned flying head slider 18.

It should be noted that the flying head slider 18, 61 may be incorporated within any recording disk drive or recording medium drive such as a magnetooptical disk drive, in addition to a magnetic recording disk drive including the aforementioned HDD.

What is claimed is:

1. A head slider comprising:

a slider body defining a medium-opposed base surface, said medium-opposed base surface being opposed to a surface of a recording medium;

a rail extending along the medium-opposed base surface;

an air bearing surface defined on the rail;

a head element mounted on the slider body and opposed to the recording medium at the air bearing surface;

a front support protrusion standing on the slider body near a leading end of the slider body, a tip end of the front support protrusion being located above a level of the air bearing surface;

a rear support protrusion standing on the slider body rearward of the front support protrusion near a trailing end of the slider body, a tip end of the rear support protrusion being located above the level of the air bearing surface; and a protector protuberance located on the air bearing surface rearward of the rear support protrusion and forward of the head element, a tip end of the protector protuberance being located below a level of the tip end of the rear support protrusion, wherein a height of the protector protuberance is set so that the tip end of the protector protuberance is at a position closer to the surface of the recording medium and beyond a level of an orbit of the head element when the slider body has an inclined flying attitute.

2. The head slider according to claim 1, wherein a following expression is established when the air bearing surface is maintained in an inclined attitude defining an inclination angle θ between a surface of the recording medium and the air $$P \geq \frac{H}{\tan\theta}$$

bearing surface:

where H is a height of the protector protuberance, and P corresponds to a distance between the trailing end of the slider body and the protector protuberance.

3. The head slider according to claim 2, wherein said protector protuberance extends in a lateral direction of the slider body by an amount larger than a width of a transducer included in the head element.

4. The head slider according to claim 3, wherein said protector protuberance is a wall extending on the air bearing surface in the lateral direction of the slider body in parallel with the transducer.

5. The head slider according to claim 4, wherein the H is set in a range between 3 nm and 20 nm.

6. The head slider according to claim 1, wherein a following $$L = S \cdot \frac{1}{2R}$$

expression is established:
where S corresponds to a relative velocity between the head slider and the recording medium R corresponds to a natural frequency of an air film formed between the slider body and the recording medium and L corresponds to a distance between the head element and the protector protuberance.

7. A head slider comprising:
a slider body defining a medium-opposed base surface, said medium-opposed base surface being opposed to a surface of a recording medium;
a front rail extending along the medium-opposed base surface near a leading end of the slider body;
a rear rail extending along the medium-opposed base surface near a trailing end of the slider body;
a front air bearing surface defined on the front rail;
a rear air bearing surface defined on the rear rail;
a head element mounted on the slider body and opposed to the recording medium at the rear air bearing surface;
a front support protrusion standing on the slider body near the leading end of the slider body, a tip end of the front support protrusion being located above a level of the front air bearing surface;
a rear support protrusion standing on the slider body rearward of the front support protrusion near the trailing end of the slider body, a tip end of the rear support protrusion being located above a level of the rear air bearing surface; and
a protector protuberance located on the rear air bearing surface rearward of the rear support protrusion and forward of the head element, a tip end of the protector protuberance being located below a level of the tip end of the rear support protrusion.

8. A head slider comprising:
a slider body defining a medium-opposed base surface, said medium-opposed base surface being opposed to a surface of a recording medium;
a rail extending along the medium-opposed base surface;
an air bearing surface defined on the rail;
a head element mounted on the slider body and opposed to the recording medium at the air bearing surface;
a pair of front support protrusions standing on the slider body near a leading end of the slider body, tip ends of the front support protrusions being located above a level of the air bearing surface;
a pair of rear support protrusions standing on the slider body rearward of the front support protrusions near a trailing end of the slider body, tip ends of the rear support protrusions being located above the level of the air bearing surface; and
a protector protuberance located on the air bearing surface rearward of the rear support protrusion and forward of the head element, a tip end of the protector protuberance being located below a level of the tip end of the rear support protrusion, wherein
the trailing end of the slider body is kept spaced from a surface of the recording medium when the tip ends of the rear support protrusions and the protector protuberance are simultaneously received on the surface of the recording medium and a height of the protector protuberance is set so that the tip end of the protector protuberance is at a position closer to the surface of the recording medium and beyond a level of an orbit of the head element when the slider body has an inclined flying attitude.

9. The head slider according to claim 8, wherein a following expression is established when the air bearing surface is maintained in an inclined attitude defining an inclination angle θ between the surface of the recording medium and the air $$P \geq \frac{H}{\tan\theta}$$

bearing surface:
where H is a height of the protector protuberance and P corresponds to a distance between the trailing end of the slider body and the protector protuberance.

10. The head slider according to claim 9, wherein said protector protuberance extends in a lateral direction of the slider body by an amount larger than a width of a transducer included in the head element.

11. The head slider according to claim 10, wherein said protector protuberance is a wall extending on the air bearing surface in the lateral direction of the slider body in parallel with the transducer.

12. The head slider according to claim 11, wherein the H is set in a range between 3 nm and 20 nm.

13. The head slider according to claim 12, wherein a following $$L = S \cdot \frac{1}{2R}$$

expression is established:
where S corresponds to a relative velocity between the head slider and the recording medium R corresponds to a natural frequency of an air film formed between the slider body and the recording medium, and L corresponds to a distance between the head element and the protector protuberance.

* * * * *